(12) United States Patent
Harada et al.

(10) Patent No.: US 7,586,759 B2
(45) Date of Patent: Sep. 8, 2009

(54) POWER SOURCE APPARATUS

(75) Inventors: Kosuke Harada, Fukuoka (JP);
Kimihiro Nishijima, Oita (JP)

(73) Assignee: Taiyo Yuden Co., Tokyo (JP)

( * ) Notice: Subject to any disclaimer, the term of this patent is extended or adjusted under 35 U.S.C. 154(b) by 99 days.

(21) Appl. No.: 10/943,350

(22) Filed: Sep. 17, 2004

(65) Prior Publication Data
US 2005/0226008 A1 Oct. 13, 2005

(30) Foreign Application Priority Data

Apr. 9, 2004 (JP) ............................. 2004-116015
Sep. 17, 2004 (JP) ............................. 2003-325035

(51) Int. Cl.
*H02M 3/335* (2006.01)
(52) U.S. Cl. ......................................... 363/16; 363/131
(58) Field of Classification Search ................... 363/15, 363/16, 20, 21.01, 21.02, 21.04, 21.06, 21.12, 363/21.14, 123, 131
See application file for complete search history.

(56) References Cited

U.S. PATENT DOCUMENTS

| 4,302,807 | A | * | 11/1981 | Mentler ....................... 363/134 |
| 4,736,284 | A | * | 4/1988 | Yamagishi et al. ............. 363/16 |
| 4,998,526 | A | * | 3/1991 | Gokhale ...................... 123/598 |
| 5,008,759 | A | | 4/1991 | Juen |
| 5,057,986 | A | * | 10/1991 | Henze et al. ................... 363/20 |
| 5,448,465 | A | * | 9/1995 | Yoshida et al. ................ 363/15 |
| 5,999,417 | A | * | 12/1999 | Schlecht ........................ 363/16 |
| 6,222,742 | B1 | * | 4/2001 | Schlecht ........................ 363/16 |
| 6,362,984 | B2 | * | 3/2002 | Gekinozu ...................... 363/97 |
| 6,388,905 | B2 | * | 5/2002 | Nakagawa ..................... 363/72 |
| 7,046,532 | B2 | * | 5/2006 | Matsuo et al. ................. 363/65 |
| 7,110,265 | B2 | * | 9/2006 | Liu et al. ....................... 363/16 |
| 2003/0218892 | A1 | * | 11/2003 | Nakagawa ............... 363/56.12 |

FOREIGN PATENT DOCUMENTS

JP 2003 102175 4/2003

* cited by examiner

*Primary Examiner*—Adolf Berhane
(74) *Attorney, Agent, or Firm*—Knobbe Martens Olson & Bear LLP

(57) ABSTRACT

The number of switches on the primary winding side of a transformer is decreased and ripples contained in the output voltage are greatly reduced. In a state I, Sia and Sib are switched ON, in a state II, Sim and Sia are switched ON, in a state III, Sia and Sib are switched ON, and in a state IV, Sim and Sib are switched ON. As a result, in the states I to III, a transformer Trsa is connected to a capacitor Ci, in the state IV, the transformer Trsa is connected to an input power source Vi supplying an electric current in the direction opposite to that of the capacitor Ci. Further, in states I, III, and IV, the transformer Trsb is connected to the capacitor Ci, and in state II, the transformer Trsb is connected to the input power source Vi supplying an electric current in the direction opposite to that of the capacitor Ci. Further, in states I to III, the electric current generated on the secondary winding side of the transformer Trsa is supplied by a rectifying diode Doa to a load R, and in states I, III, and IV, the electric current generated on the secondary winding side of the transformer Trsb is supplied by a rectifying diode Dob to the load R.

14 Claims, 10 Drawing Sheets

(a)

(b)

(c)

POWER SOURCE APPARATUS

BACKGROUND OF THE INVENTION

1. Field of the Invention

The present invention relates to a power source apparatus, more particularly, to a technology for reducing ripples contained in the output voltage.

2. Description of the Related Art

Power sources for digital IC are required to supply a low-voltage high-current at a high throughput rate and to retain the fluctuations of an output voltage within a very narrow range. However, in general power source systems, a high-capacity smoothing capacitor is necessary at the output side to satisfy those requirements. Furthermore, in a low-voltage high-current environment, despite the fact that the effect of impedance components in the circuit becomes considerably large, presently available technology fails to produce parts with sufficiently low impedance. For this reason, in order to inhibit the decrease in efficiency, increase in output voltage ripples, increase in switching surges, and the like caused by the impedance components, many power sources have to be implemented as multiphase configurations and an output smoothing capacitor has to be connected in parallel, resulting in a larger number of parts, increased cost, and enlarged size of the circuits.

In a system suggested as effective means for resolving the above-mentioned problems, a DC voltage is supplied, in principle, without an output smoothing capacitor in a low-voltage high-current region by using two insulated step-down inverters, inducing rectangular waveform voltages with a phase difference of 180° in the secondary windings of the inverters, half-wave rectifying and superimposing the voltages.

Such a system was disclosed, for example, in JP-A-2003-102175. Thus, this system comprises a pair of switching elements, which are connected by one terminal thereof to both terminals of primary windings of at least two output transformers connected by neutral points thereof to one pole of an input DC power source, and by other terminal to the other pole of the input DC power source, means for controlling this pair of switching elements that one of them is non-conductive if the other is conductive, and rectifying means connected to each secondary winding of each aforementioned output transformer, wherein the conducting timing of each switching element is so set that the output voltage values of the rectifying means are equal to each other, and ripples of one rectified output waveform are covered by the other rectified output waveforms.

Further, U.S. Pat. No. 5,008,759 discloses a two-phase converter similar to that of the aforementioned patent reference. This two-phase converter employs means to synthesize the transformer outputs with an 180° phase difference by controlling the charging timing from a power supply source to a capacitance element and discharging timing from the capacitance elements to each transformer by using equivalently four switching elements.

The above-described power source apparatuses were useful because ripples contained in the output voltage were very small, the output smoothing circuit was unnecessary in principle, and the apparatuses could be small, lightweight, and highly efficient. However, all the above-described approaches required four switching elements at a primary winding side of the output transformer.

SUMMARY OF THE INVENTION

One aspect of the invention reduces the number of switching elements required on the primary winding side of the output transformer and to decrease greatly the ripples contained in the output voltage.

Another aspect of the invention provides a novel power source apparatus which enables a soft start.

One embodiment of the invention provides a power source apparatus which comprises first and second transformers, first to third switching elements connected to a primary winding side of the first and second transformers, a capacitor connected to the primary winding side of the first and second transformers, a first rectifying element connected to the secondary winding side of the first transformer, a second rectifying element connected to the secondary winding side of the second transformer, and a control unit for controlling the operation of the first to third switching elements. Further, the control unit, in a first period, controls the electric current flowing in the primary windings of the first and second transformers so that the electric current generated in the secondary windings of the first and second transformers is supplied to a load via the first and second rectifying elements by switching ON the second and third switching elements (for example, switching elements Sia and Sib in one embodiment). Further, in a second period, the control unit controls the electric current flowing in the primary windings of the first and second transformers so that the electric current generated in the secondary winding of the first transformer (for example, transformer Trsa in one embodiment) is supplied to the load via the first rectifying element by switching ON the first and second switching elements (for example, switching elements Sim and Sia in one embodiment). Further, in a third period, the control unit controls the electric current flowing in the primary windings of the first and second transformers so that the electric current generated in the secondary windings of the first and second transformers is supplied to the load via the first and second rectifying elements by switching ON the second and third switching elements. In a fourth period, the control unit controls the electric current flowing in the primary windings of the first and second transformers so that the electric current generated in the secondary winding of the second transformer is supplied to the load via the second rectifying element by switching ON the first and third switching elements (for example, switching elements Sim and Sib in one embodiment).

It is thus possible to supply a DC voltage, in principle, without an output smoothing capacitor by using three switching elements provided in the primary winding side of the transformers, inducing rectangular waveform voltages with a phase difference of 180° to the secondary winding side of the transformers, and half-wave rectifying and superimposing the voltages with rectifying elements.

Further, in the first period, a voltage (for example, including the output voltage itself) corresponding to the output voltage of the capacitor may be applied to the primary windings of the first and second transformers, in the second period, a voltage (for example, including the output voltage itself) corresponding to the output voltage of the capacitor may be applied to the primary winding of the first transformer, in the third period, a voltage (for example, including the output voltage itself) corresponding to the output voltage of the capacitor may be applied to the primary windings of the first and second transformers, and in the fourth period, a voltage (for example, including the output voltage itself) corresponding to the output voltage of the capacitor may be applied to the primary winding of the second transformer. For example, a soft start is possible, in one embodiment.

Further, the aforementioned capacitor may be divided into a first capacitor for the first transformer and a second capacitor for the second transformer. Such a configuration includes two capacitors at the primary winding side, but the number of switching elements can be decreased to three, and ripples contained in the output voltage can be greatly reduced. Moreover, dividing the capacitor facilitates the adjustment of capacitance.

In the case of such a division into the first capacitor and second capacitor, in the first period, a voltage (for example, including the output voltage itself) corresponding to the output voltage of the first capacitor may be applied to the primary winding of the first transformer, and a voltage (for example, including the output voltage itself) corresponding to the output voltage of the second capacitor may be applied to the primary winding of the second transformer; in the second period, a voltage (for example, including the output voltage itself) corresponding to the output voltage of the first capacitor may be applied to the primary winding of the first transformer; in the third period, a voltage (for example, including the output voltage itself) corresponding to the output voltage of the first capacitor may be applied to the primary winding of the first transformer and a voltage (for example, including the output voltage itself) corresponding to the output voltage of the second capacitor may be applied to the primary winding of the second transformer; and in the fourth period, a voltage (for example, including the output voltage itself) corresponding to the output voltage of the second capacitor may be applied to the primary winding of the second transformer. In this case, a soft start can be achieved, too.

Further, in the case of such a division into the first capacitor and second capacitor, in the first period, the input voltage of an input power source and a voltage corresponding to the output voltage of the first capacitor may be applied to the primary winding of the first transformer and the input voltage of the input power source and a voltage corresponding to the output voltage of the second capacitor may be applied to the primary winding of the second transformer; in the second period, the input voltage of the input power source and a voltage corresponding to the output voltage of the first capacitor may be applied to the primary winding of the first transformer; in the third period, the input voltage of the input power source and a voltage corresponding to the output voltage of the first capacitor may be applied to the primary winding of the first transformer and the input voltage of the input power source and a voltage corresponding to the output voltage of the second capacitor may be applied to the primary winding of the second transformer; and in the fourth period, the input voltage of the input power source and a voltage corresponding to the output voltage of the second capacitor may be applied to the primary winding of the second transformer.

A period of switching OFF the first to third switching elements may be provided in the change-over interval of the first to fourth periods, and the exciting inductance may be set so that the exciting current of the transformers normally oscillates to the positive and negative sides. As a result, zero-voltage soft switching of the circuit can be achieved.

Further, the aforementioned first rectifying element can be a fourth switching element, the second rectifying element can be a fifth switching element, and the control unit can control the fourth switching element in the same manner as the second switching element and can control the fifth switching element in the same manner as the third switching element.

If a diode is used as a rectifying element, then a voltage drop that appears in the diode is about 0.5 V and exercises a significant influence in the case of a low-voltage output. In such a case, controlling the switching elements in the above-described manner makes it possible to obtain a similar effect and also to reduce the voltage drop and increase efficiency.

Further, the first rectifying element and the second transformer may be connected, and the terminal of the first rectifying element on the current output side and the terminal of the second rectifying element on the current input side may be connected by a snub circuit having a rectifying element. Such a circuit configuration allows the number of snub circuits to be reduced.

Another embodiment of the invention provides a power source apparatus, which comprises a bridge rectifying circuit connected to an input AC power source, an input capacitor (for example, a capacitor Cim in one embodiment), a first transformer (for example, a transformer Trsa in one embodiment) whose primary winding is connected to the first terminal of the input capacitor, a first capacitor (for example, a capacitor Cia in one embodiment) connected by a first terminal to the first transformer, a second transformer (for example, a transformer Trsb in one embodiment), a first switching element (for example, a switching element Sim in one embodiment) for connecting the second terminal of the first capacitor and the primary winding of the second transformer, a second switching element (for example, a switching element Sia in one embodiment) for connecting the second terminal of the first capacitor and the second terminal of the input capacitor, a second capacitor (for example, a capacitor Cib in one embodiment) connected in series with the primary winding of the second transformer, a third switching element (for example, a switching element Sib in one embodiment) for connecting the first terminal of the input capacitor and the primary winding of the second transformer, a coil (for example, a coil Lpfc in one embodiment) connected between the bridge rectifying circuit and the primary winding of the second transformer, a first rectifying element (for example, a diode Doa in one embodiment) connected to the secondary winding side of the first transformer, a second rectifying element (for example, a diode Dob in one embodiment) connected to the secondary winding side of the second transformer, and a control unit for controlling the operation of the first to third switching elements. The control unit conducts control so as to switch ON the second and third switching elements in a first period, to switch ON the first and second switching elements in a second period, to switch ON the second and third switching elements in a third period, and to switch ON the first and third switching elements in a fourth period, and in the first to third periods, the electric current generated in the secondary winding side of the first transformer is supplied by the first rectifying element to a load, and in the first, third, and fourth periods, the electric current generated in the secondary winding side of the second transformer is supplied by the second rectifying element to the load.

In one embodiment, the power source apparatus additionally has a PFC (Power Factor Correction) function.

Another embodiment of the invention provides a power source apparatus, which comprises first and second transformers, a capacitance element connected to each transformer, a switching circuit provided on the primary winding side of each transformer and connected to a power supply source, a rectifying circuit for rectifying and also synthesizing the output of the secondary winding side of each transformer and for supplying the output after the synthesis to a load, and a control circuit for controlling the operation of the switching circuit according to the value of the output supplied to the load. The switching circuit is composed of three switching elements, and the control circuit changes the connection state of the capacitance element with respect to each transformer and the connection state of the power supply source with respect to each transformer by controlling the drive timing of the three switching elements.

Further, the aforementioned three switching elements can be configured to form a first mode of forming a closed loop composed of the primary winding of the first transformer and the capacitance element and forming a closed loop composed of the primary winding of the second transformer and the capacitance element, a second mode of forming a closed loop composed of the primary winding of the first transformer and the capacitance element and forming a closed loop composed of the primary winding of the second transformer and the power supply source, and a third mode of forming a closed loop composed of the primary winding of the second transformer and the capacitance element and forming a closed loop composed of the primary winding of the first transformer and the power supply source.

Further, the aforementioned three switching elements can be configured to form a first mode of forming a closed loop composed of the primary winding of the first transformer, the capacitance element, and the power supply source and forming a closed loop composed of the primary winding of the second transformer, the capacitance element, and the power supply source, a second mode of forming a closed loop composed of the primary winding of the first transformer, the capacitance element, and the power supply source and forming a closed loop composed of the primary winding of the second transformer and the capacitance element, and a third mode of forming a closed loop composed of the primary winding of the second transformer, the capacitance element, and the power supply source and forming a closed loop composed of the primary winding of the first transformer and the capacitance element.

Still another embodiment of the invention provides a power source apparatus, which comprises first and second transformers, a capacitance element connected to each transformer, a switching circuit provided on the primary winding side of each transformer and connected to a power supply source, a rectifying circuit for rectifying and also synthesizing the output of the secondary winding side of each transformer and for supplying the output after the synthesis to a load, and a control circuit for controlling the operation of the switching circuit according to the value of the output supplied to the load. The switching circuit comprises first to third switching elements, the first switching element, in the ON state, constitutes a closed loop composed of the primary winding of the first transformer and the capacitance element and, in association with the third switching element in the ON state, constitutes a closed loop composed of the primary winding of the second transformer and the power supply source. Further, the second switching element, in the ON state, constitutes a closed loop composed of the primary winding of the second transformer and the capacitance element and, in association with the third switching element in the ON state, constitutes a closed loop composed of the primary winding of the first transformer and the power supply source. The third switching element, in the OFF state, disconnects each transformer and the capacitance element from the power supply source.

Still another embodiment of the invention provides a power source apparatus, which comprises first and second transformers, a first capacitance element connected to the first transformer, a second capacitance element connected to the second transformer, a switching circuit provided on the primary winding side of each transformer and connected to a power supply source, a rectifying circuit for rectifying and also synthesizing the output of the secondary winding side of each transformer and for supplying the output after the synthesis to a load, and a control circuit for controlling the operation of the switching circuit according to the value of the output supplied to the load. The switching circuit is composed of the first to third switching elements, and the first switching element, in the ON state, constitutes a closed loop composed of the primary winding of the first transformer, the first capacitance element, and the power supply source and, in association with the third switching element in the ON state, constitutes a closed loop composed of the primary winding of the second transformer and the second capacitance element. Further, the second switching element, in the ON state, constitutes a closed loop composed of the primary winding of the second transformer, the second capacitance element, and the power supply source and, in association with the third switching element in the ON state, constitutes a closed loop composed of the primary winding of the first transformer and the first capacitance element. Further, the third switching element, in the OFF state, provides for parallel connection of a closed loop composed of the primary winding of the first transformer, the first capacitance element, and the power supply source and a closed loop composed of the primary winding of the second transformer, the second capacitance element, and the power supply source.

Yet another embodiment of the invention provides a power source, which comprises first and second transformers, a first capacitance element connected to the first transformer, a second capacitance element connected to the second transformer, a switching circuit provided on the primary winding side of each transformer and connected to a power supply source, a rectifying circuit for rectifying and also synthesizing the output of the secondary winding side of each transformer and for supplying the output after the synthesis to a load, and a control circuit for controlling the operation of the switching circuit according to the value of the output supplied to the load. The switching circuit is composed of the first to third switching elements, and the first switching element, in the ON state, constitutes a closed loop composed of the primary winding of the first transformer and the first capacitance element and, in association with the third switching element in the ON state, constitutes a closed loop composed of the primary winding of the second transformer, the second capacitance element, and the power supply source. Further, the second switching element, in the ON state, constitutes a closed loop composed of the primary winding of the second transformer and the second capacitance element and, in association with the third switching element in the ON state, constitutes a closed loop composed of the primary winding of the first transformer, the first capacitance element, and the power supply source. Further, the third switching element, in the OFF state, disconnects primary windings of each transformer and the first and second capacitance elements from the power supply source.

There are a plurality of circuit configurations for realizing the above-described features of various embodiments of the present invention. Various embodiments of the present invention include, but not limited to, the below-described circuit examples.

With various embodiments of the present invention, the number of switching elements for the primary winding side of the transformers can be decreased and ripples contained in the output voltage can be greatly reduced.

In another aspect, a power source apparatus that can be soft started is realized.

BRIEF DESCRIPTION OF THE DRAWINGS

The foregoing and other features of the invention will become more fully apparent from the following description and appended claims taken in conjunction with the following drawings, in which like reference numerals indicate identical or functionally similar elements.

DESCRIPTION OF THE PREFERRED EMBODIMENTS

First Preferred Embodiment

Figure 1:
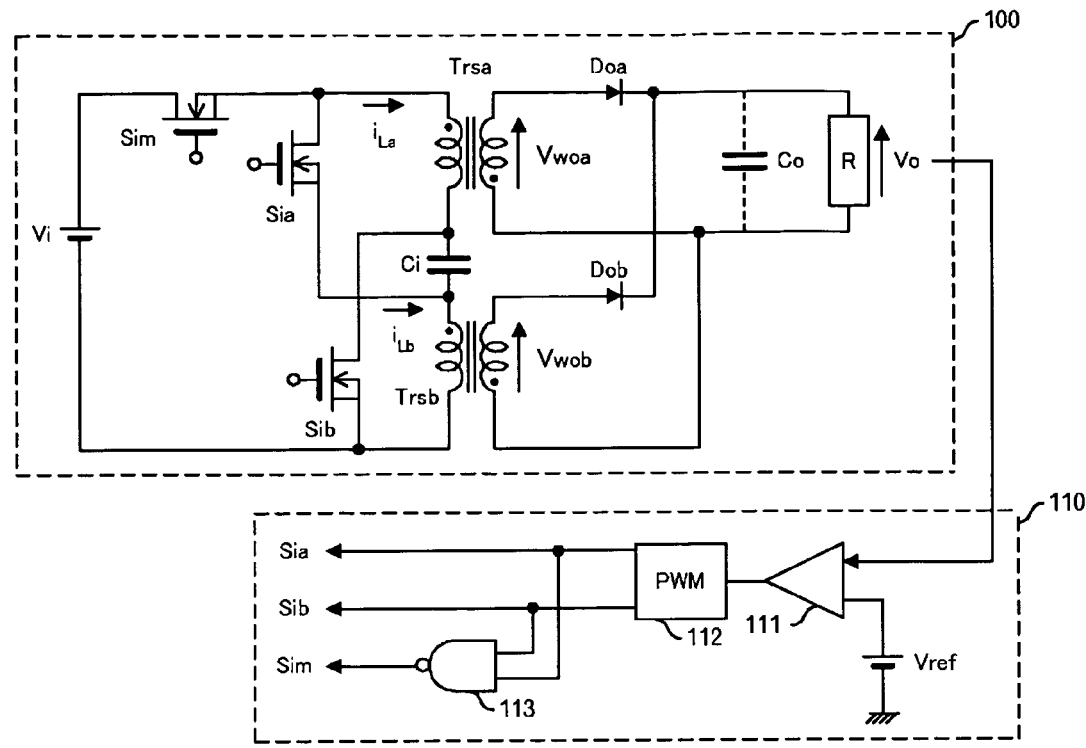
FIG. 1 is a circuit diagram of a power source apparatus according to a first preferred embodiment of the invention.

A circuit diagram of the first preferred embodiment of the present invention is shown in FIG. 1. A two-phase insulated converter 100 comprises an input DC power source Vi, switching elements Sim, Sia, Sib, which are a MOSFET (Metal-Oxide Semiconductor Field Effect Transistor), transformers Trsa and Trsb in which primary windings and secondary windings have inverted polarities, a capacitor Ci, diodes Doa and Dob which are rectifying elements, a smoothing capacitor Co, and a load R. In principle, the smoothing capacitor Co is not required, but it is shown herein because it is actually preferred to connect a capacitor with a capacitance lower than that of the conventional circuits. A control unit 110 comprises a reference voltage source Vref, a comparator 111, a PWM (Pulse Width Modulator) 112, and a NAND circuit 113.

The positive pole terminal of the input DC power source Vi is connected to the drain of the switching element Sim. The source of the switching element Sim is connected to the drain of the switching element Sia and one terminal of the primary winding of the transformer Trsa. The other terminal of the primary winding of the transformer Trsa is connected to one terminal of the capacitor Ci and the drain of the switching element Sib. The other terminal of the capacitor Ci is connected to the source of the switching element Sia and a terminal of the primary winding of the transformer Trsb. The negative pole terminal of the input DC power source Vi is connected to the source of the switching element Sib, and the other terminal of the primary winding of the transformer Trsb.

One terminal of the secondary winding of the transformer Trsa is connected to the anode of the diode Doa. The cathode of the diode Doa is connected to the positive pole terminal of the load R, one terminal of the smoothing capacitor Co, and the cathode of the diode Dob. The other terminal of the secondary winding of the transformer Trsa is connected to the negative pole terminal of the load R and the other terminal of the smoothing capacitor Co. One terminal of the secondary winding of the transformer Trsb is connected to the anode of the diode Dob. The cathode of the diode Dob is connected to the positive pole terminal of the load R. The other terminal of the secondary winding of the transformer Trsb is connected to the other terminal of the secondary winding of the transformer Trsa.

The output voltage Vo of the load R is inputted in the first input terminal of the comparator 111 of the control unit 110, and the reference voltage Vref is inputted into the second input terminal. The output of the comparator 111, which is based on the difference between the reference voltage Vref and output voltage Vo, is inputted into the PWM 112, the first output of the PWM 112 is outputted to the gate of the switching element Sia, and the second output is outputted to the gate of the switching element Sib. Further, the first output and the second output are inputted into the NAND circuit 113, and the output of the NAND circuit 113 is outputted to the gate of the switching element Sim.

Figure 2:
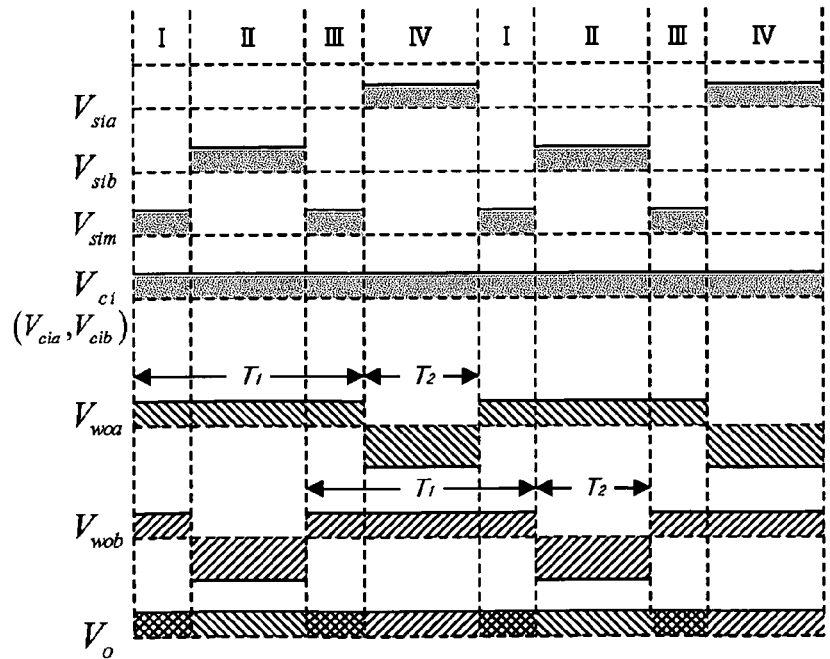
FIG. 2 is a voltage waveform diagram for each component of the circuit.

FIG. 2 shows voltage waveforms in each component of the two-phase insulated converter 100 shown in FIG. 1. Here, the voltage between the drain and source of the switching element Sia is denoted by Vsia, the voltage between the drain and source of the switching element Sib is denoted by Vsib, the voltage between the drain and source of the switching element Sim is denoted by Vsim, the voltage generated at both ends of the capacitor Ci is denoted by Vci, the voltage induced in the secondary winding side of the transformer Trsa is denoted by Vwoa, the voltage induced in the secondary winding side of the transformer Trsb is denoted by Vwob, and the output voltage of the load R is denoted by Vo. ON/OFF changing of the voltages Via, Vib, and Vsim provides voltages applied to gates of each switching element.

In the present embodiment, a total of four states (alternatively referred to as periods) I, II, III, and IV occur repeatedly.

Figure 3:
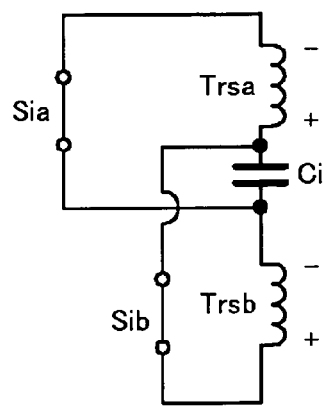
FIG. 3A is a diagram of an equivalent circuit in the state I of the circuit relating to the first preferred embodiment.
FIG. 3B is a diagram of an equivalent circuit in the state II of the circuit relating to the first preferred embodiment.
FIG. 3C is a diagram of an equivalent circuit in the state IV of the circuit relating to the first preferred embodiment.
Figure 3:
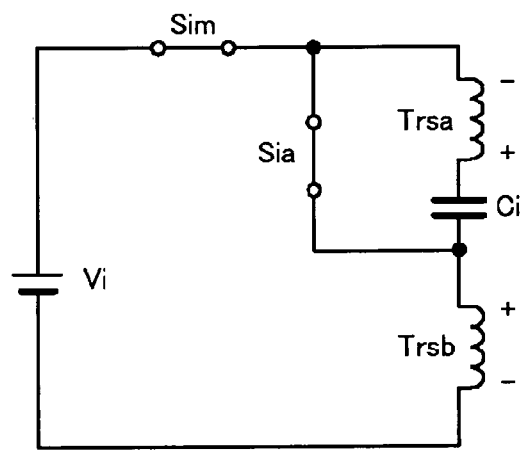
Figure 3:
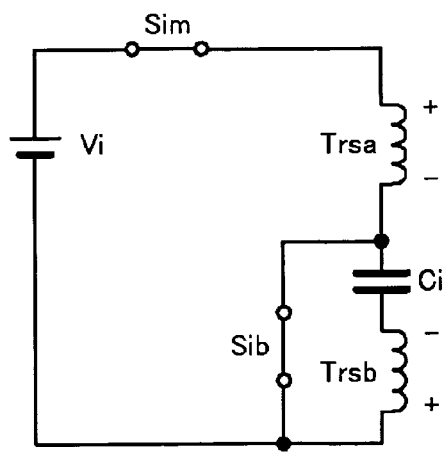

In the state I, the switching element Sia and switching element Sib are ON and the switching element Sim is OFF. Therefore, as shown by an equivalent circuit of the primary winding side presented in FIG. 3A, the capacitor Ci is connected to the transformer Trsa and transformer Trsb. Because the primary winding and secondary winding have inverted polarities in the transformer Trsa and transformer Trsb, positive voltages are induced in the secondary winding sides in the state I (not shown). The values of the voltages are described in detail below. Therefore, in the state I, the voltage Vwoa corresponding to the voltage Vci in the capacitor Ci is induced in the secondary winding side of the transformer Trsa, and the voltage Vwob corresponding to the voltage Vci is induced in the secondary winding side of the transformer Trsb. In this case, electric currents flow in the forward direction of the diode Doa and diode Dob, and those currents generate the output voltage Vo in the load R.

In the state II, the switching element Sia is ON, the switching element Sib is OFF, and the switching element Sim is ON. Therefore, as shown by an equivalent circuit of the primary winding side presented in FIG. 3B, the capacitor Ci is connected to the transformer Trsa, and the input DC power source Vi is connected to the transformer Trsb. Because the primary winding and secondary winding have inverted polarities in the transformer Trsa and transformer Trsb, a positive voltage is induced in the secondary winding side of the transformer Trsa and a negative voltage is induced in the secondary winding side of the transformer Trsb in the state II (not shown). The values of the voltages are described in detail below. Therefore, in the state II, the voltage Vwoa corresponding to the voltage Vci in the capacitor Ci is induced in the secondary winding side of the transformer Trsa, and the voltage Vwob corresponding to the voltage Vi in the input DC power source Vi is induced in the secondary winding side of the transformer Trsb. In this case, an electric current flows in the forward direction of the diode Doa, and this current generates the output voltage Vo in the load R. On the other hand, because the voltage induced in the secondary winding side of the transformer Trsb is inverted, half-wave rectification is conducted by the diode Dob, and the electric current does not flow.

In the state III, the switching element Sia and the switching element Sib are ON, and the switching element Sim is OFF. This is identical to the state I and the explanation is therefore omitted.

In the state IV, the switching element Sia is OFF and the switching element Sim and the switching element Sib are ON. Therefore, as shown by an equivalent circuit of the primary winding side presented in FIG. 3C, the capacitor Ci is connected to the transformer Trsb, and the input DC power source Vi is connected to the transformer Trsa. Because the primary winding and secondary winding have inverted polarities in the transformer Trsa and transformer Trsb, a negative voltage is induced in the secondary winding side of the transformer Trsa and a positive voltage is induced in the secondary winding side of the transformer Trsb in the state IV (not shown). The values of the voltages are described in detail below. Therefore, in the state IV, the voltage Vwoa corresponding to the voltage Vi in the input DC power source Vi is induced in the secondary winding side of the transformer Trsa, and the voltage Vwob corresponding to the voltage Vci in the capacitor Ci is induced in the secondary winding side of the transformer Trsb. In this case, an electric current flows in the forward direction of the diode Dob, and this current generates the output voltage Vo in the load R. On the other hand, because the voltage induced in the secondary winding side of the transformer Trsa is inverted, half-wave rectification is conducted by the diode Doa and the electric current does not flow.

As shown in FIG. 2, the induced voltage Vwoa in the secondary winding side of the transformer Trsa is positive within the period T1 of states I, II, and III, and an electric current flows to the load R via the diode Doa. Further, the voltage is negative within the period T2 of the state IV, and the electric current is interrupted by the diode Doa. On the other hand, the induced voltage Vwob in the secondary winding side of the transformer Trsb is positive within the period T1 of states III, IV, and I, and an electric current flows to the load R via the diode Dob. Further, the voltage is negative within the period T2 of the state II, and the electric current is interrupted by the diode Dob.

As a result, those operations are equivalent to configuring a voltage up-down inverter as a two-phase, and if the capacitor Ci is provided with sufficient capacitance to produce a DC voltage, then a rectangular waveform voltage shown in FIG. 2 is induced in the secondary windings of each transformer. Therefore, if their waveforms are half-wave rectified by diodes Doa and Dob and superimposed, a DC voltage Vo can be generated despite the absence of the smoothing capacitor Co.

Further, the smoothing capacitor Co is unnecessary in principle, but a response delay actually occurs when the load current rapidly changes under the effect of a leakage inductance of the transformers or parasitic inductance of the wiring. The smoothing capacitor Co is provided to compensate this delay of response. However, if the leakage inductance of the transformers is sufficiently controlled, then the capacitance of the smoothing capacitor can be reduced. As a result, a ceramic capacitor with a low internal equivalent serial resistance (low ESR) can be used.

The power source apparatus shown in FIG. 1 will be analyzed below in more detail. Here, the exciting inductance of each transformer will be denoted by L, and the effect of leakage inductance or wiring resistance will be ignored. Further, the switching elements and capacitor Ci are assumed to be ideal elements.

First, in the period T1, the transformers are linked to the capacitor Ci. Therefore, if the voltage of the capacitor Ci is denoted by Vci and the exciting current components flowing in the primary winding side of each transformer are denoted by $i_{L1}$ and $i_{L2}$, then the following differential equation can be obtained.

$$\frac{di_{L1}}{dt} = \frac{di_{L2}}{dt} = -\frac{V_{Ci}}{L} \quad (1)$$

In a high-frequency region, the exciting current is considered to be decreasing linearly. Therefore, the following decrease in the electric current in the period T1 can be obtained from Formula (1).

$$\Delta i_{L1} = \Delta i_{L2} = \frac{V_{Ci}}{L} T_1 \quad (2)$$

In the period T2, the transformers are linked to the power source Vi. Therefore, the following differential equation can be obtained.

$$\frac{di_{L1}}{dt} = \frac{di_{L1}}{dt} = \frac{V_i}{L} \quad (3)$$

The increase in electric current in the period T2 is as follows.

$$\Delta i_{L1} = \Delta i_{L2} = \frac{V_i}{L} T_2 \quad (4)$$

In a stationary state, the decrease and increase of the current are the same. Therefore, the voltage Vci of the capacitor Ci can be represented as follows from Formulas (2) and (4).

$$V_{Ci} = \frac{T_2}{T_1} V_i \quad (5)$$

Here, the voltage induced in the secondary winding side of each transformer in the period T1 is a value obtained by dividing the voltage Vci by the turn ratio n (=number of turns in the primary winding divided by the number of turns in the secondary winding) of the transformer.

$$V_{L1} = V_{L2} = \frac{V_{Ci}}{n} \quad (6)$$

Therefore, if Formula (5) is substituted for Formula (6), we can see that the following constant voltage is generated in a positive side of the secondary winding.

$$V_{L1} = V_{L2} = \frac{T_2}{T_1} \frac{V_i}{n} \quad (7)$$

Then, in the period T2, the voltage induced in the secondary winding side of each transformer is reversed, and a constant voltage of a value obtained by dividing the voltage Vi of the input DC power source Vi by the turn ratio, n, $$V_{L1} = V_{L2} = -\frac{V_i}{n} \quad (8)$$

is generated in the positive side of the secondary winding.

Therefore, if only positive waveforms Vwoa and Vwob are picked out by the diode Doa and diode Dob and superimposed, then the following output voltage Vo is obtained. Here T1≧T2.

$$V_o = \frac{T_2}{T_1} \frac{V_i}{n} \quad (9)$$

This formula demonstrates, in the present embodiment, that the output voltage can be easily adjusted by adequately controlling the periods T1 and T2 with the PWM 112.

Further, in the secondary winding side in the state I of the present embodiment, a voltage corresponding to the voltage Vci in the capacitor Ci is induced according to Formula (6). However, at the time of start, the capacitor Ci is not charged and thus the voltage starts from 0 V. Therefore, the voltages Vwoa and Vwob induced in the secondary winding side and the output voltage Vo also start from 0. The capacitor Ci is thereafter charged in the course of repeated cyclic operations. Therefore, gradually induced voltages Vwoa and Vwob and the output voltage Vo also increase. Therefore, a soft start function is realized.

Thus, with the present embodiment, by contrast with the conventional technology which required four switching elements, the number of switching elements can be reduced to three. Therefore, the size can be decreased and the cost can be reduced. Furthermore, because the capacitance of the smoothing capacitor Co can be reduced to a minimum, further reduction in size is possible. Moreover, decreasing the capacitance of the smoothing capacitor Co makes it possible to use a multilayer ceramic capacitor having a low-impedance characteristic, and reliability can be increased. Moreover, since a transition to a higher efficiency is possible, heat emitting components such as heat sinks are not required, and cost can be further reduced.

Second Preferred Embodiment

Figure 4:
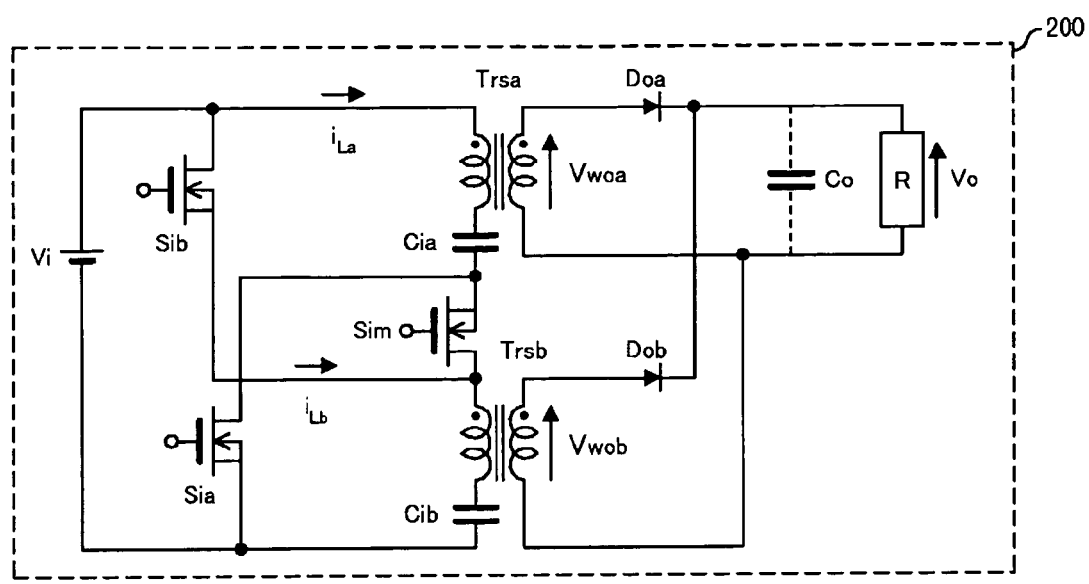
FIG. 4 is a circuit diagram of a power source apparatus according to a second preferred embodiment of the invention.

A circuit diagram of the second preferred embodiment of the present invention is shown in FIG. 4. A control unit 110 has the same configuration in this embodiment, and the explanation thereof is herein omitted. The elements corresponding to the elements used in the first embodiment are assigned with the same reference symbols. A two-phase insulated converter 200 of the present embodiment comprises an input DC power source Vi, switching elements Sim, Sia, Sib, which are a MOSFET, transformers Trsa and Trsb in which primary windings and secondary windings have the same polarities, a capacitor Cia and a capacitor Cib, diodes Doa and Dob, which are rectifying elements, a smoothing capacitor Co, and a load R.

The positive pole terminal of the input DC power source Vi is connected to the drain of the switching element Sib and one terminal of the primary winding of the transformer Trsa. The other terminal of the primary winding of the transformer Trsa is connected to one terminal of the capacitor Cia. The other terminal of the capacitor Cia is connected to the drain of the switching element Sia and the source of the switching element Sim. The source of the switching element Sib is connected to the drain of the switching element Sim and one terminal of the primary winding of the transformer Trsb. The other terminal of the primary winding of the transformer Trsb is connected to one terminal of the capacitor Cib. The negative pole terminal of the input DC power source Vi is connected to the source of the switching element Sia and the other terminal of the capacitor Cib.

One terminal of the secondary winding of the transformer Trsa is connected to the anode of the diode Doa. The cathode of the diode Doa is connected to the positive pole terminal of the load R, one terminal of the smoothing capacitor Co, and the cathode of the diode Dob. The other terminal of the secondary winding of the transformer Trsa is connected to the negative pole terminal of the load R and the other terminal of the smoothing capacitor Co. One terminal of the secondary winding of the transformer Trsb is connected to the anode of the diode Dob. The cathode of the diode Dob is connected to the positive pole terminal of the load R. The other terminal of the secondary winding of the transformer Trsb is connected to the other terminal of the secondary winding of the transformer Trsa.

Voltage waveforms in each component of the two-phase insulated converter 100, which are shown in FIG. 2, are the same in the present embodiment. However, the voltage Vci generated in the capacitor Ci corresponds to the voltage Vcia generated in the capacitor Cia and the voltage Vcib generated in the capacitor Cib of the present embodiment.

Figure 5:
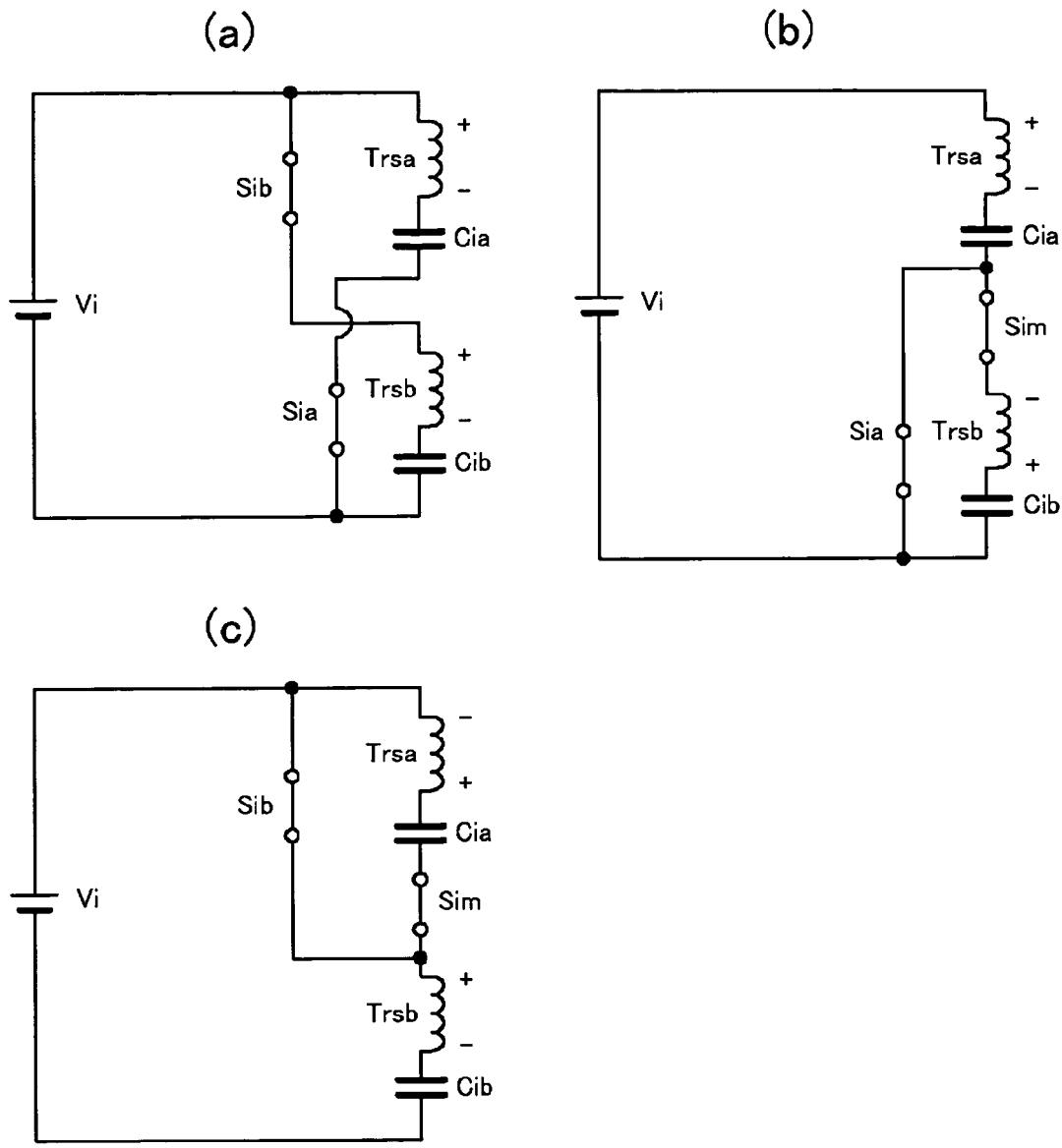
FIG. 5A is a diagram of an equivalent circuit in the state I of the circuit relating to the second preferred embodiment.
FIG. 5B is a diagram of an equivalent circuit in the state II of the circuit relating to the second preferred embodiment.
FIG. 5C is a diagram of an equivalent circuit in the state IV of the circuit relating to the second preferred embodiment.

In the state I, the switching element Sia and switching element Sib are ON, and the switching element Sim is OFF. Therefore, as shown by an equivalent circuit of the primary winding side presented in FIG. 5A, the positive terminal of the input DC power source Vi and capacitor Cia are connected to the transformer Trsa, and the positive pole terminal of the input DC power source Vi and capacitor Cib are connected to the transformer Trsb. Because in the transformer Trsa and transformer Trsb, the primary winding and secondary winding have the same polarities, in the state I, positive voltages are induced in the secondary winding sides (not shown). The values of the voltages are described in detail below. Therefore, in the state I, the voltage Vwoa corresponding to the input DC voltage Vi and the voltage Vci (assumed to be=Vcia=Vcib) of the capacitor Cia is induced in the secondary winding side of the transformer Trsa, and the voltage Vwob corresponding to the input DC voltage Vi and the voltage Vci of the capacitor Cib is induced in the secondary winding side of the transformer Trsb. In this case, electric currents flow in the forward direction of the diode Doa and diode Dob, and those currents generate the output voltage Vo in the load R.

In the state II, the switching element Sia is ON, the switching element Sib is OFF, and the switching element Sim is ON. Therefore, as shown by an equivalent circuit of the primary winding side presented in FIG. 5B, the positive pole terminal of the input DC power source Vi and the capacitor Cia are connected to the transformer Trsa, and the capacitor Cib is connected to the transformer Trsb. Because the primary winding and secondary winding have the same polarities in the transformer Trsa and transformer Trsb, a positive voltage is induced in the secondary winding side of the transformer Trsa and a negative voltage is induced in the secondary winding side of the transformer Trsb in the state II (not shown). The values of the voltages are described in detail below. Therefore, in the state II, the voltage Vwoa corresponding to the input DC voltage Vi and the voltage Vci of the capacitor Cia is induced in the secondary winding side of the transformer Trsa, and the voltage Vwob corresponding to the voltage Vci of the capacitor Cib is induced in the secondary winding side of the transformer Trsb. In this case, an electric current flows in the forward direction of the diode Doa, and this current generates the output voltage Vo in the load R. On the other hand, because the voltage induced in the secondary winding side of the transformer Trsb is inverted, half-wave rectification is conducted by the diode Dob and the electric current does not flow.

In the state III, the switching element Sia and the switching element Sib are ON, and the switching element Sim is OFF. This is identical to the state I and the explanation thereof is omitted.

In the state IV, the switching element Sia is OFF and the switching elements Sim and Sib are ON. Therefore, as shown by an equivalent circuit of the primary winding side presented in FIG. 5C, the capacitor Cia is connected to the transformer Trsa, and the input DC power source Vi and the capacitor Cib are connected to the transformer Trsb. Because the primary winding and secondary winding have the same polarities in the transformer Trsa and transformer Trsb, a negative voltage is induced in the secondary winding side of the transformer Trsa and a positive voltage is induced in the secondary winding side of the transformer Trsb in the state IV (not shown). The values of the voltages are described in detail below. Therefore, in the state IV, the voltage Vwoa corresponding to the voltage Vci of the capacitor Cia is induced in the secondary winding side of the transformer Trsa, and the voltage Vwob corresponding to the input DC voltage Vi and the voltage Vci of the capacitor Cib, is induced in the secondary winding side of the transformer Trsb. In this case, an electric current flows in the forward direction of the diode Dob, and this current generates the output voltage Vo in the load R. On the other hand, because the voltage induced in the secondary winding side of the transformer Trsa is inverted, half-wave rectification is conducted by the diode Doa and the electric current does not flow.

As shown in FIG. 2, the induced voltage Vwoa in the secondary winding side of the transformer Trsa is positive within the period T1 of states I, II, and III, and an electric current flows to the load R via the diode Doa. Further, the voltage is negative within the period T2 of the state IV, and the electric current is interrupted by the diode Doa. On the other hand, the induced voltage Vwob in the secondary winding side of the transformer Trsb is positive within the period T1 of states III, IV, and I, and an electric current flows to the load R via the diode Dob. Further, the voltage is negative within the period T2 of the state II, and the electric current is interrupted by the diode Dob.

Thus, if the capacitor Cia and capacitor Cib are provided with a sufficient capacitance and a DC voltage is produced, then a rectangular waveform voltage shown in FIG. 2 is induced in the secondary winding of each transformer. Therefore, if those waveforms are half-wave rectified by diodes Doa and Dob and superimposed, then a DC voltage Vo can be generated despite the absence of the smoothing capacitor Co. The reason why the smoothing capacitor Co is provided in the actual circuit is identical to that explained in the first embodiment.

The power source apparatus shown in FIG. 4 will be analyzed below in more detail. The premises set forth herein are identical to those of the first embodiment.

First, in the period T1, the primary windings of the transformers are linked to the input DC voltage Vi and capacitors Cia or Cib, and in the period T2, they are linked to the capacitor Cia or Cib. Therefore, if the voltage of each capacitor is denoted by Vci, then the increase in electric current in the period T1 will be as follows.

$$\Delta i_{L1} = \Delta i_{L2} = \frac{V_i - V_{Ci}}{L} T_1 \qquad (10)$$

The decrease in electric current in the period T2 will be as follows.

$$\Delta i_{L1} = \Delta i_{L2} = \frac{V_{Ci}}{L} T_2 \qquad (11)$$

In a stationary state, the decrease and increase of the current are the same. Therefore, the voltage Vci of the capacitors can be represented as follows from Formulas (10) and (11).

$$V_{Ci} = \frac{T_1}{T_1 + T_2} V_i \qquad (12)$$

Here, the voltage induced in the secondary winding side of each transformer in the period T1 is a value obtained by dividing the difference between the input power source voltage Vi and the voltage Vci by the turn ratio n. Therefore, if Formula (5) is substituted we can see that the following constant voltage is generated in the positive side of the secondary winding.

$$V_{L1} = V_{L2} = \frac{V_i - V_{Ci}}{n} = \frac{T_2}{T_1 + T_2} \frac{V_i}{n} \quad (13)$$

Then, in the period T2, the voltage induced in the secondary winding side of each transformer is reversed and a constant voltage $$V_{L1} = V_{L2} = -\frac{V_{Ci}}{n} = -\frac{T_1}{T_1 + T_2} \frac{V_i}{n} \quad (14)$$

obtained by dividing the voltage Vci by the turn ratio, n, is induced.

Therefore, if only positive waveforms Vwoa and Vwob are picked out by the diode Doa and diode Dob and superimposed, then the following output voltage Vo is obtained. Here $T1 \geq T2$.

$$V_o = \frac{T_2}{T_1 + T_2} \frac{V_i}{n} \quad (15)$$

Such a power source unit of the second embodiment demonstrates an effect identical to that of the power source apparatus of the first embodiment.

Third Preferred Embodiment

Figure 6:
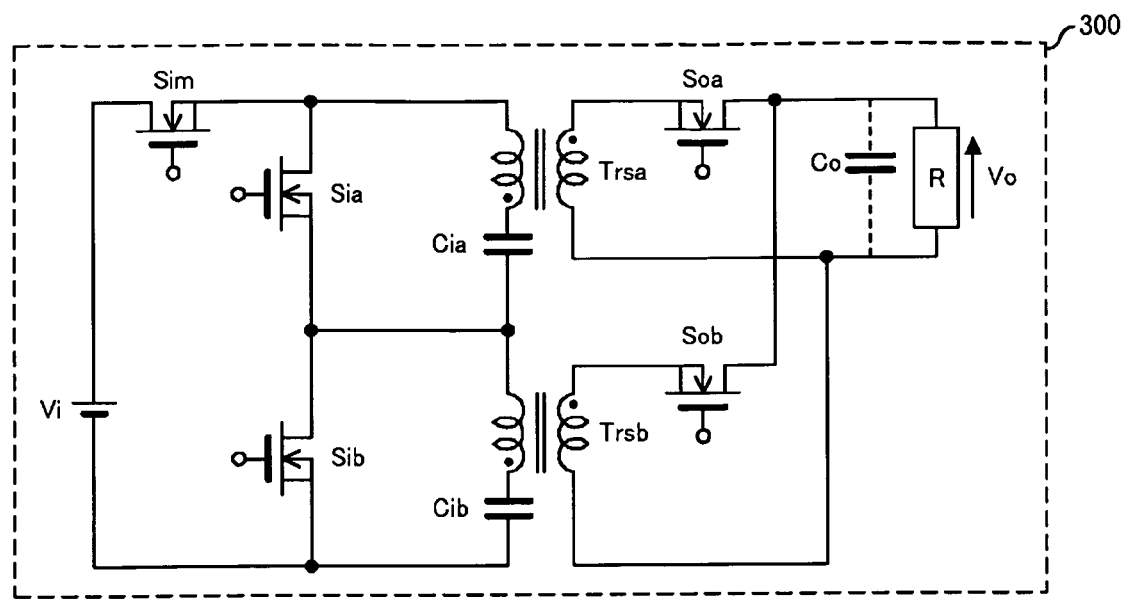
FIG. 6 is a circuit diagram of a power source apparatus according to a third preferred embodiment of the invention.

A circuit diagram of the third preferred embodiment of the present invention is shown in FIG. 6. A control unit 110 has the same configuration in this embodiment, and the explanation thereof is herein omitted. Further, the elements corresponding to the elements used in the first embodiment are assigned with the same reference symbols. A two-phase insulated converter 300 of the present embodiment comprises an input DC power source Vi, switching elements Sim, Sia, Sib, Soa, Sob which are a MOSFET, transformers Trsa and Trsb in which primary windings and secondary windings have the inverted polarities, a capacitor Cia and a capacitor Cib, a smoothing capacitor Co, and a load R.

The positive pole terminal of the input DC power source Vi is connected to the drain of the switching element Sim. The source of the switching element Sim is connected to the drain of the switching element Sia and one terminal of the primary winding of the transformer Trsa. The other terminal of the primary winding of the transformer Trsa is connected to one terminal of the capacitor Cia. The source of the switching element Sia is connected to the other terminal of the capacitor Cia, one terminal of the primary winding of the transformer Trsb, and the drain of the switching element Sib. Further, the other terminal of the transformer Trsb, in which one terminal of the primary winding is connected to the source of the switching element Sia and the drain of the switching element Sib, is connected to one terminal of the capacitor Cib. The other terminal of the capacitor Cib is connected to the source of the switching element Sib and the negative pole terminal of the input DC power source Vi.

One end of the secondary winding of the transformer Trsa is connected to the source of the switching element Soa. On the other hand, the drain of the switching element Soa is connected to the positive pole terminal of the load R, one terminal of the smoothing capacitor Co, and the drain of the switching element Sob. The other terminal of the secondary winding of the transformer Trsa is connected to the negative pole terminal of the load R and the other terminal of the smoothing capacitor Co. One terminal of the secondary winding of the transformer Trsb is connected to the source of the switching element Sob. The drain of the switching element Sob is connected to the positive pole terminal of the load R. The other terminal of the secondary winding of the transformer Trsb is connected to the other terminal of the secondary winding of the transformer Trsa and the negative pole terminal of the load R.

Voltage waveforms in each component of the two-phase insulated converter 100, which are shown in FIG. 2, are the same as those in the present embodiment. However, the voltage Vci generated in the capacitor Ci corresponds to the voltage Vcia generated in the capacitor Cia and the voltage Vcib generated in the capacitor Cib of the present embodiment.

Figure 7:
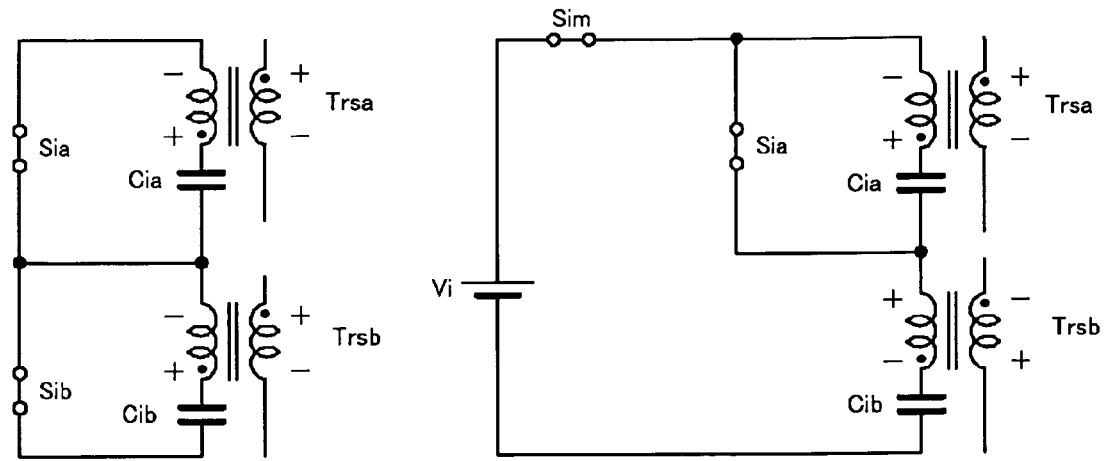
FIG. 7A is a diagram of an equivalent circuit in the state I of the circuit relating to the third preferred embodiment.
FIG. 7B is a diagram of an equivalent circuit in the state II of the circuit relating to the third preferred embodiment.
FIG. 7C is a diagram of an equivalent circuit in the state IV of the circuit relating to the third preferred embodiment.
Figure 7:
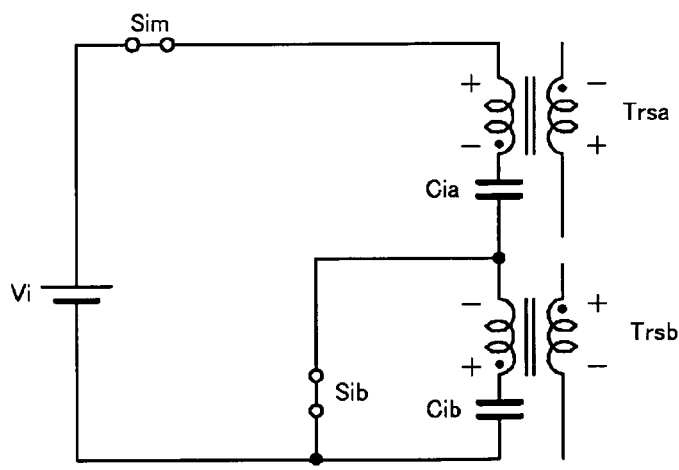

In the state I, the switching element Sia and switching element Sib are ON and the switching element Sim is OFF. Therefore, as shown by an equivalent circuit of the primary winding side presented in FIG. 7A, the capacitor Cia is connected to the transformer Trsa, and the capacitor Cib is connected to the transformer Trsb. Thus, the charge that was accumulated in the capacitor Cia is supplied to the transformer Trsa, and the charge that was accumulated in the capacitor Cib is supplied to the transformer Trsb. Because the primary winding and secondary winding have the inverted polarities in the transformer Trsa and transformer Trsb, positive voltages are induced in the secondary winding sides in the state I. Therefore, in the state I, the voltage Vwoa corresponding to the voltage Vcia of the capacitor Cia is induced in the secondary winding side of the transformer Trsa, and the voltage Vwob corresponding to the voltage Vcib is induced in the secondary winding side of the transformer Trsb. At this time, the electric currents flow because the switching elements Soa and Sob are ON, and those currents generate the output voltage Vo in the load R.

In the state II, the switching element Sia is ON, the switching element Sib is OFF, and the switching element Sim is ON. Therefore, as shown by an equivalent circuit of the primary winding side presented in FIG. 7B, the capacitor Cia is connected to the transformer Trsa, and the input DC power source Vi is connected to the transformer Trsb. Because the primary winding and secondary winding have the inverted polarities in the transformer Trsa and transformer Trsb, a positive voltage is induced in the secondary winding side of the transformer Trsa and a negative voltage is induced in the secondary winding side of the transformer Trsb in the state II. Therefore, in the state II, the voltage Vwoa corresponding to the voltage Vcia in the capacitor Cia is induced in the secondary winding side of the transformer Trsa, and the voltage Vwob corresponding to the input DC voltage Vi and the voltage (Vi−Vcib) based on the capacitor Cib is induced in the secondary winding side of the transformer Trsb. At this time, in the secondary winding side, only the switching element Soa is ON. Therefore, an electric current caused by the voltage Vwoa corresponding to the voltage Vcia flows in the load R and the output voltage Vo is generated. On the other hand, because the voltage induced in the secondary winding side of the transformer Trsb is inverted and the switching element Sob is OFF, the electric current does not flow to the load R.

In the state III, the switching element Sia and the switching element Sib are ON and the switching element Sim is OFF. This is identical to the state I and the explanation thereof is omitted.

In the state IV, the switching element Sia is OFF, and the switching element Sim and the switching element Sib are ON. Therefore, as shown by an equivalent circuit of the primary winding side presented in FIG. 7C, the capacitor Cib is connected to the transformer Trsb, and the input DC power source Vi is connected to the transformer Trsa. Because the primary winding and secondary winding have the inverted polarities in the transformer Trsa and transformer Trsb, a negative voltage is induced in the secondary winding side of the transformer Trsa and a positive voltage is induced in the secondary winding side of the transformer Trsb in the state IV. Therefore, in the state IV, the voltage Vwoa corresponding to the input DC power source Vi and voltage (Vi−Vcia) based on the capacitor Cia is induced in the secondary winding side of the transformer Trsa, and the voltage Vwob corresponding to the capacitor Cib is induced in the secondary winding side of the transformer Trsb. At this time, because the switching element Sob is ON, an electric current flows and this current generates the output voltage Vo in the load R. On the other hand, because the voltage induced in the secondary winding side of the transformer Trsa is inverted, the switching element Soa is OFF. Therefore, the electric current does not flow to the load R.

As shown in FIG. 2, the induced voltage Vwoa in the secondary winding side of the transformer Trsa is positive within the period T1 of states I, II, and III, and the switching element Soa is ON. Therefore an electric current flows to the load R. Further, the voltage is negative within the period T2 of the state IV and the switching element Sob is also OFF. Therefore, the electric current is interrupted. At the same time, the induced voltage Vwob in the secondary winding side of the transformer Trsb is positive within the period T1 of states III, IV, and I, and the switching element Sob is ON. Therefore an electric current flows to the load R. Further, the voltage is negative within the period T2 of the state II and the switching element Sob is also OFF. Therefore, the electric current is interrupted.

As a result, similarly to the second embodiment, those operations are identical to those of a step-down inverter having a two-phase configuration, and if a sufficient capacitance is provided to the capacitor Cia and capacitor Cib and a DC voltage is produced, a rectangular waveform voltage shown in FIG. 2 is induced in the secondary winding side of each transformer. Therefore, if those waveforms are half-wave rectified by diodes Doa and Dob and superimposed, then a DC voltage Vo can be generated despite the absence of the smoothing capacitor Co. The reason why the smoothing capacitor Co is provided in actual circuits is identical to that explained in the first embodiment.

Further, in the present embodiment, similarly to the first embodiment, in the state I, a voltage corresponding to the voltage Vcia (or Vcib) in the capacitor Cia (or Cib) is induced in the secondary winding side. However, at the start time, the capacitor Cia or Cib is not charged and started from 0 V. Therefore, the voltage Vwoa (and Vwob) induced in the secondary winding side and also the output voltage Vo are started from 0. As the switching operations are thereafter repeated, the capacitors Cia and Cib are charged. Therefore, the gradually induced voltage Vwoa (and Vwob) and also the output voltage Vo are increased. As a result, a soft start function is demonstrated. Formulas relating to voltage in the present embodiment are identical to those of the first embodiment.

In one embodiment, the switching elements Soa and Sob can be replaced with diodes.

Fourth Embodiment

Figure 8:
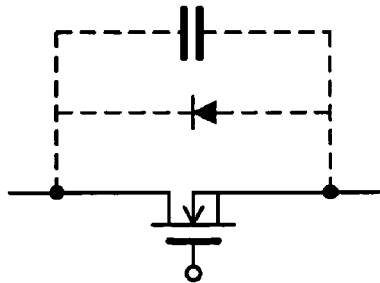
FIG. 8 is a model of a parasitic component of a FET.
Figure 9:
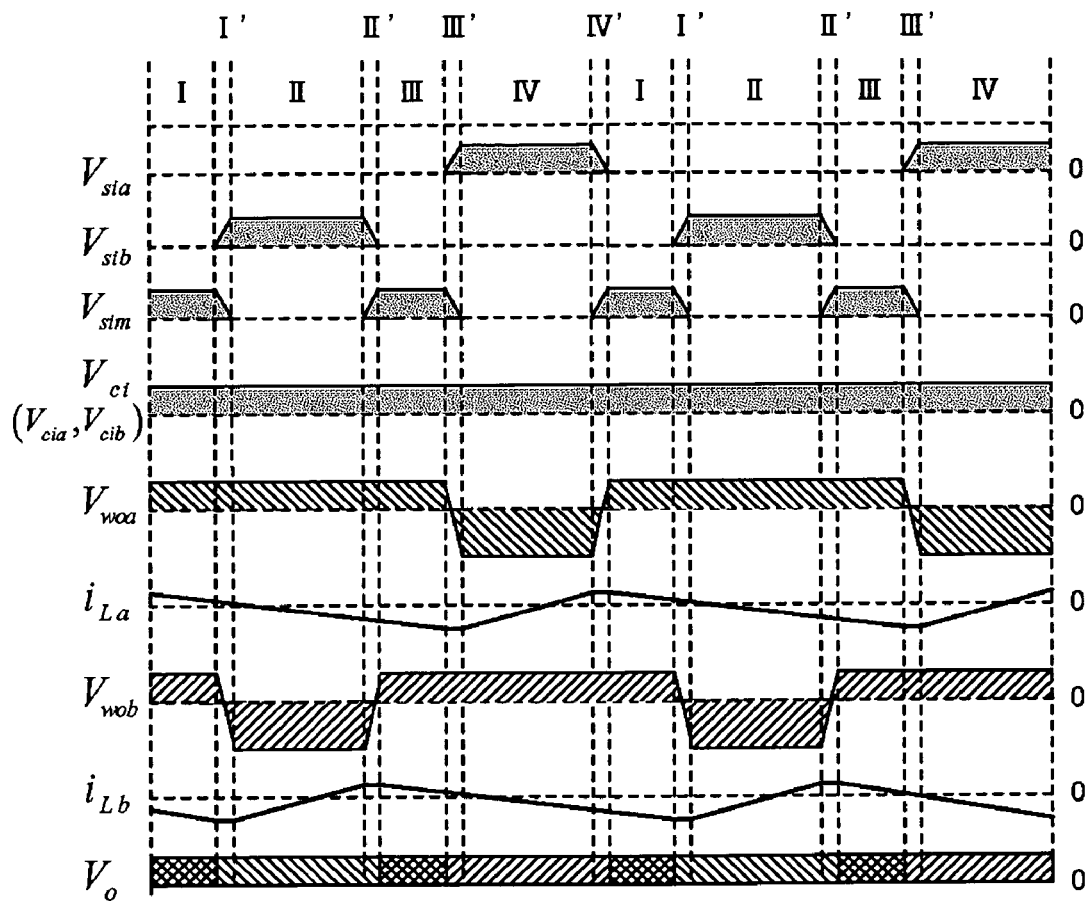
FIG. 9 is a voltage waveform diagram obtained when zero-voltage soft switching is conducted.

Because a switching element that is a FET has a parasitic capacitance component, as shown in FIG. 8, the energy that accumulated by the parasitic capacitance in the OFF period of the switch is discharged when the switching element is switched to ON, thereby producing current surge and switching loss. Here, as shown in FIG. 9 (waveforms of cases illustrated by FIG. 1 and FIG. 6; in the case illustrated by FIG. 4, the directions of currents $i_{La}$ and $i_{Lb}$ are inverted), a dead time, in which all the switching elements are switched OFF when the switching state is changed over, is provided between the states. Thus, a state I' is provided as a dead time between the state I and state II, a state II' is provided between the state II and state III, a state III' is provided between the state III and state IV, and a state IV' is provided between the state IV and state I. Further, as shown in FIG. 9, if the exciting inductance is so set that the exciting currents $i_{La}$ and $i_{Lb}$ of the transformer constantly oscillate, assuming positive and negative values, then a zero-voltage soft switching is possible. In the present embodiment, this can be realized by switching all the switching elements OFF in the state I', state II', state III', and state IV', without adding special components or the like.

In this case, the energy accumulated by the parasitic capacitance in the OFF period of the switching elements is washed away by the action of the exciting currents $i_{La}$ and $i_{Lb}$ of the transformer in the subsequent dead time period and they are all restored to the input DC voltage Vi. Therefore, the voltage of the switching elements reduces to zero, and after it becomes zero, the exciting currents pass through the body diodes of the switching elements. Therefore, the voltage of the switching elements is held in the zero state. As a result, if a switching element necessary in this period is switched ON, a zero-voltage soft switching is realized and the occurrence of switching loss or surge is prevented.

Fifth Embodiment

Figure 10:
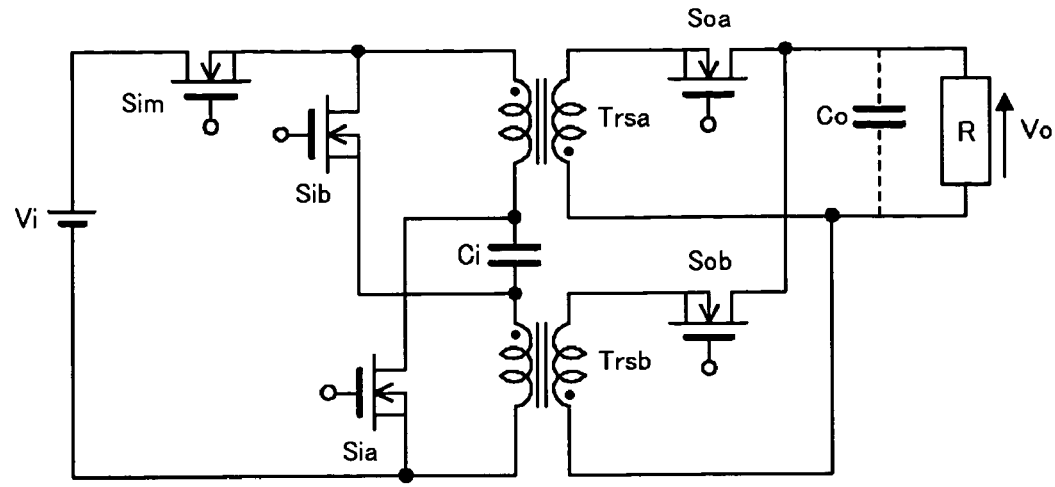
FIG. 10 is a circuit diagram illustrating a modification example of the first embodiment.
Figure 11:
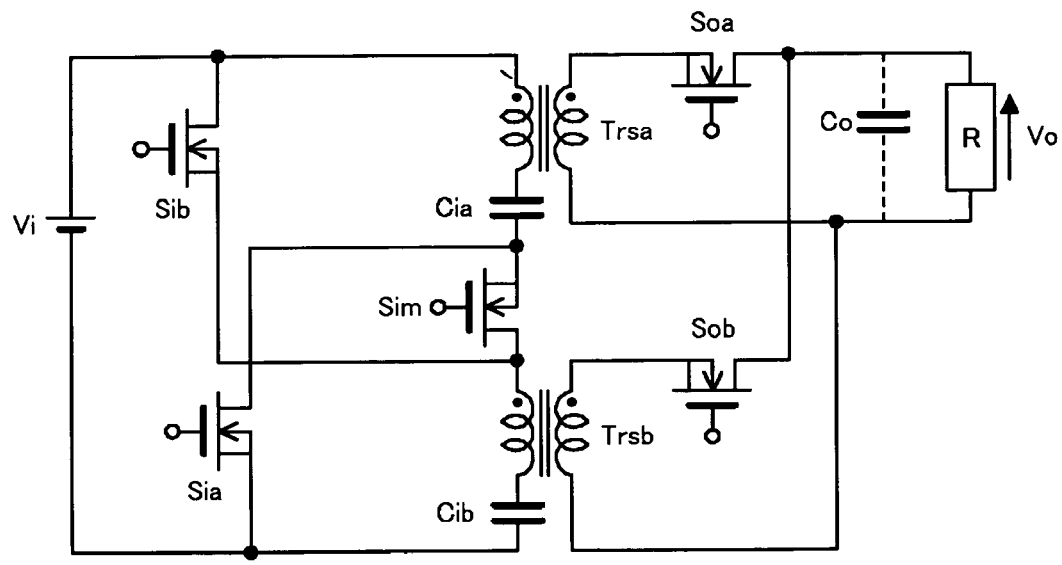
FIG. 11 is a circuit diagram illustrating a modification example of the second embodiment.

In one embodiment, diodes that are the rectifying elements on the secondary winding side of the transformer can be replaced with switching elements for synchronous rectification. A modification example of the two-phase insulated converter 100 of the first embodiment is shown in FIG. 10. By contrast with FIG. 1, a switching element Soa is provided instead of the diode Doa, one terminal on the secondary winding side of the transformer Trsa is connected to the source of the switching element Soa, and the terminal on the positive electrode side of the load R is connected to the drain of the switching element Soa. Further, a switching element Sob is provided instead of the diode Dob. One terminal on the secondary winding side of the transformer Trsb is connected to the source of the switching element Sob, and the terminal on the positive side of the load R is connected to the drain of the switching element Sob. Similarly, a modification example of the two-phase insulated converter 200 of the second embodiment is shown in FIG. 11. By contrast with FIG. 4, a switching element Sob is provided instead of the diode Dob, one terminal on the secondary winding side of the transformer Trsb is connected to the source of the switching element Sob, and the terminal on the positive electrode side of the load R is connected to the drain of the switching element Sob. Further, a switching element Soa is provided instead of the diode Doa. One terminal on the secondary winding side of the transformer Trsa is connected to the source of the switching element Soa, and the terminal on the positive side of the load R is connected to the drain of the switching element Soa. Further, in the switching element Soa, a control signal identical to that of the switching element Sia is applied by the control unit 110 to the gate, and in the switching element Sob, a control signal identical to that of the switching element Sib is applied by the control unit 110 to the gate.

In switching power sources, diodes are usually used as rectifying elements, but a forward voltage drop of at least 0.5 V occurs in the rectifying diodes. Therefore, a significant decrease in power source efficiency is observed in low-voltage power sources. As a result, in case of low-voltage high-current power sources, semiconductor switching elements are used instead of rectifying diodes, and in such a configuration, it is effective to use a synchronous rectifying system conducting ON/OFF switching synchronously with the voltage waveform of Vwoa and Vwob. In this case, because the ON resistance of a FET is as small as several m$\Omega$, the power source efficiency can be greatly improved.

Figure 12:
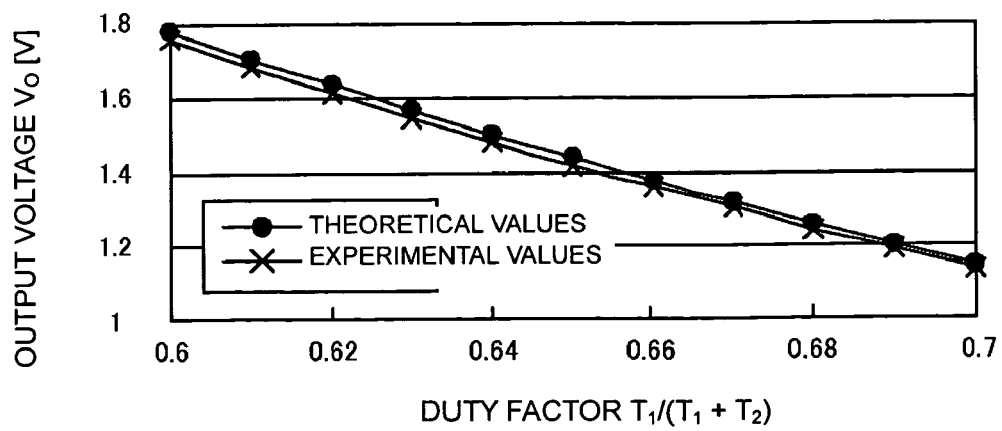
FIG. 12 is a graph illustrating the relation between the output voltage and the duty factor.
Figure 13:
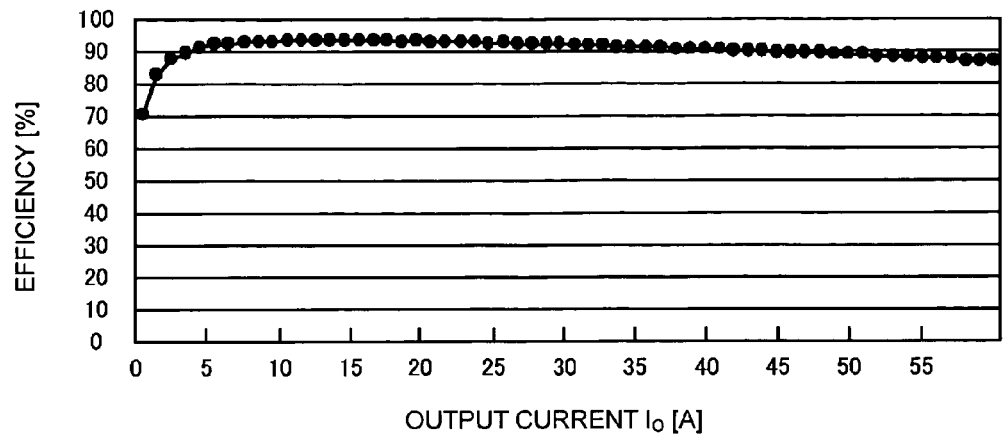
FIG. 13 is a graph illustrating the relation between the efficiency and the output current.

A test was conducted with the following circuit parameters in order to evaluate the present embodiment shown in FIG. 10. The results obtained are shown in FIG. 12 and FIG. 13. Input voltage Vi=48 V, output voltage Vo=1.5 V, capacitance Ci=4.4 µF of the capacitor Ci, capacitance Co=400 µF of the smoothing capacitor Co, turn ratio n=1/18 of the transformer Trsa and transformer Trsa, ON resistance 1 m$\Omega$ of the switching elements Soa and Sob, and switching frequency 100 MHz.

FIG. 12 shows the output voltage vs. a duty ratio (time ratio). Theoretic values represented by Formula (9) practically match the measured values. Therefore, the PWM control of the output voltage is possible. Furthermore, FIG. 13 shows the circuit efficiency vs. the output current. A high efficiency of 90% or higher is obtained up to an output current of 40 A, and an efficiency as high as 86% is obtained at a 60 A output.

Sixth Embodiment

Figure 14:
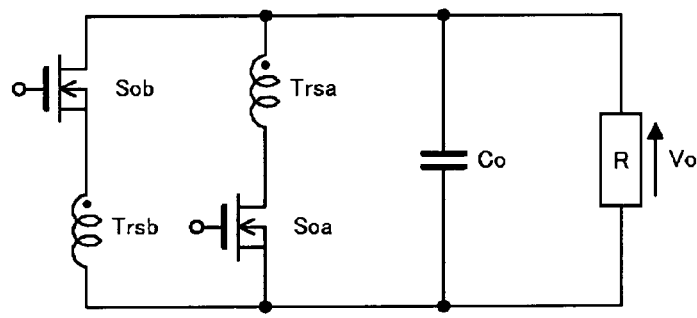
FIG. 14 is a circuit diagram illustrating modification examples of the third and fifth embodiments.

The secondary winding sides of the two-phase insulated converters shown in FIG. 6, FIG. 10, and FIG. 11 can be changed as shown in FIG. 14. The difference between the configuration shown in FIG. 14 and those shown in FIGS. 6, 10, and 11 is that one terminal of the secondary winding of the transformer Trsa is connected to the load R, the other terminal thereof is connected to the drain of the switching element Soa, and the source of the switching element Soa is connected to the other terminal which is not the terminal of the load R and secondary winding of the transformer Trsb which is connected to the source of the switching element Sob. That is, the order of the transformer Trsa and switching element Soa was changed.

Figure 15:
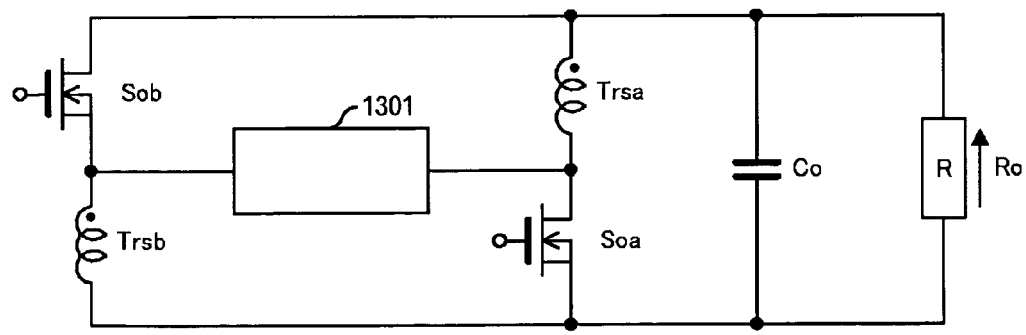
FIG. 15 is a circuit diagram illustrating the arrangement example of a snub circuit.
Figure 16:
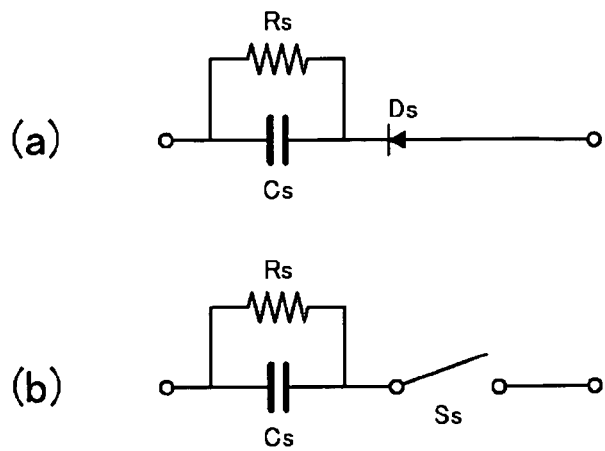
FIGS. 16A and 16B are circuit diagrams illustrating the examples of snub circuits.

However, employing such a connection mode makes it possible to reduce the number of snub circuits by one that usually have to be provided for each switching element. Thus, as shown in FIG. 15, a snub circuit 1301 is provided between the source of the switching element Sob and the drain of the switching element Soa. In the present embodiment, the snub circuit 1301 comprises a rectifying element. For example, as shown in FIG. 16A, the configuration is such that the capacitor Cs and resistor Rs are connected in parallel and a diode Ds is connected in series thereto. Furthermore, as shown in FIG. 16B, the capacitor Cs and resistor Rs are connected in parallel and a switching element Ss (for example, a FET) is connected in series thereto. In this case, the switching element Ss is switched ON/OFF by the same control signal as the switching element Sim.

As a result, a surge occurring when the switching element is ON/OFF switched is prevented. Further, in the case illustrated by FIG. 1 and FIG. 4, too, if the configuration is modified as shown in FIG. 14, that is if the order of the diode Doa and transformer Trsa is changed, then a snub circuit can be connected to the cathode of the diode Doa and the anode of the diode Dob.

Seventh Embodiment

Figure 17:
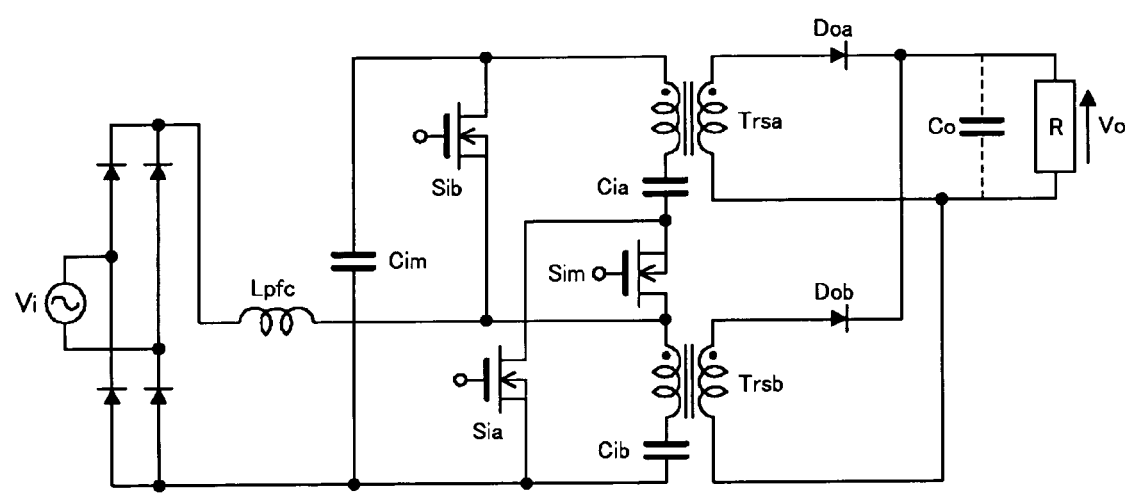
FIG. 17 is a circuit diagram illustrating an example of a one-converter circuit having a power factor correction function.

In one embodiment, the two-phase insulated converter 200 of the above-described second embodiment can be modified into a one-converter circuit comprising a power factor correction function, such as shown in FIG. 17.

The configuration shown in FIG. 17 comprises an input AC power source Vi, a bridge rectification circuit composed of four diodes, a coil Lpfc, an input capacitor Cim, switching elements Sia, Sib, and Sim, capacitors Cia and Cib, transformers Trsa and Trsb, and diodes Doa and Dob, and a load R. The input AC power source Vi is connected to the bridge rectification circuit, and the bridge rectification circuit is further connected to one terminal of the coil Lpfc. The other terminal of the coil Lpfc is connected to the source of the switching element Sib and the drain of the switching element Sim. One terminal of the input capacitor Cim is connected to the drain of the switching element Sib and one terminal of the primary winding side of the transformer Trsa, and the other terminal thereof is connected to the source of the switching element Sia and the bridge rectification circuit.

One terminal of the primary winding side of the transformer Trsa is connected to one terminal of the input capacitor Cim and the drain of the switching element Sib, and the other terminal is connected to one terminal of the capacitor Cia. The other terminal of the capacitor Cia is connected to the source of the switching element Sim and the drain of the switching element Sia. The drain of the switching element Sim is connected to one terminal on the primary winding side of the transformer Trsb and the source of the switching element Sib. The other terminal on the primary winding side of the transformer Trsb is connected to one terminal of the capacitor Cib, and the other terminal of the capacitor Cib is connected to the source of the switching element Sia and the bridge rectification circuit. The secondary winding side of the transformer in FIG. 17 is identical to that shown in FIG. 4 and the explanation thereof is herein omitted.

In the circuit shown in FIG. 17, the switching elements on the primary winding sides of the transformers function as PFC switches, and when both the switching element Sia and the switching element Sim are ON, energy is accumulated in the coil Lpfc, and this energy charges the input capacitor Cim when the switching element Sib is ON. At this time, the power factor can be improved if an inductance is set such that the current in the coil Lpfc operates in an unstable mode and if a capacitance is provided which is sufficient for generating a DC current in the input capacitor Cim.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A power source apparatus, comprising:
   first and second transformers, wherein the primary windings of said first and second transformers are connected in series with a power source;
   first to third switching elements connected to the primary windings of said first and second transformers;
   a capacitor connected to the primary windings of said first and second transformers;
   a first rectifying element connected to the secondary winding of said first transformer;
   a second rectifying element connected to the secondary winding of said second transformer; and
   a control unit for controlling an operation of said first to third switching elements; wherein
   said control unit,
   in a first period, controls electric currents flowing in the primary windings of said first and second transformers so that electric currents generated in the secondary windings of said first and second transformers are supplied to a load via said first and second rectifying elements by switching said second and third switching elements ON;
   in a second period, controls the electric currents flowing in the primary windings of said first and second transformers so that the electric current generated in the secondary winding of said first transformer is supplied to the load via said first rectifying element by switching said first and second switching elements ON;
   in a third period, controls the electric currents flowing in the primary windings of said first and second transformers so that the electric currents generated in the secondary windings of said first and second transformers are supplied to the load via said first and second rectifying elements by switching said second and third switching elements ON; and
   in a fourth period, controls the electric currents flowing in the primary windings of said first and second transformers so that the electric current generated in the secondary winding of said second transformer is supplied to the load via said second rectifying element by switching said first and third switching elements ON.

2. The power source apparatus according to claim 1, wherein
   in said first period, a voltage corresponding to the output voltage of said capacitor is applied to the primary windings of said first and second transformers;
   in said second period, the voltage corresponding to the output voltage of said capacitor is applied to the primary winding of said first transformer;
   in said third period, the voltage corresponding to the output voltage of said capacitor is applied to the primary windings of said first and second transformers; and
   in said fourth period, the voltage corresponding to the output voltage of said capacitor is applied to the primary winding of said second transformer.

3. The power source apparatus according to claim 1, wherein
   said capacitor comprises a first capacitor for said first transformer and a second capacitor for said second transformer.

4. The power source apparatus according to claim 1, wherein
   said capacitor comprises a first capacitor for said first transformer and a second capacitor for said second transformer;
   in said first period, a voltage corresponding to the output voltage of said first capacitor is applied to the primary winding of said first transformer and a voltage corresponding to the output voltage of said second capacitor is applied to the primary winding of said second transformer;
   in said second period, the voltage corresponding to the output voltage of said first capacitor is applied to the primary winding of said first transformer;
   in said third period, the voltage corresponding to the output voltage of said first capacitor is applied to the primary winding of said first transformer and the voltage corresponding to the output voltage of said second capacitor is applied to the primary winding of said second transformer; and
   in said fourth period, the voltage corresponding to the output voltage of said second capacitor is applied to the primary winding of said second transformer.

5. The power source apparatus according to claim 1, wherein
   said capacitor comprises a first capacitor for said first transformer and a second capacitor for said second transformer;
   in said first period, the input voltage of an input power source and a voltage corresponding to the output voltage of said first capacitor are applied to the primary winding of said first transformer and the input voltage of said input power source and a voltage corresponding to the output voltage of said second capacitor are applied to the primary winding of said second transformer;
   in said second period, the input voltage of said input power source and the voltage corresponding to the output voltage of said first capacitor are applied to the primary winding of said first transformer;
   in said third period, the input voltage of said input power source and the voltage corresponding to the output voltage of said first capacitor are applied to the primary winding of said first transformer and the input voltage of said input power source and the voltage corresponding to the output voltage of said second capacitor are applied to the primary winding of said second transformer; and
   in said fourth period, the input voltage of said input power source and the voltage corresponding to the output voltage of said second capacitor are applied to the primary winding of said second transformer.

6. The power source apparatus according to claim 1, wherein a period of switching OFF of said first to third switching elements is provided in the changing points of said first to fourth periods.

7. The power source apparatus according to claim 1, wherein
   said first rectifying element is a fourth switching element;
   said second rectifying element is a fifth switching element; and
   said control unit controls said fourth switching element in the same manner as said second switching element, and controls said fifth switching element in the same manner as said third switching element.

8. The power source apparatus according to claim 1, wherein
   said first rectifying element and said second transformer are connected, and
   the terminal of said first rectifying element on the current output side and the terminal of said second rectifying clement on the current input side are connected by a snub circuit having a rectifying element.

9. A power source apparatus comprising:
a bridge rectifying circuit connected to an input AC power source;
an input capacitor;
a first transformer whose primary winding is connected to the first terminal of said input capacitor;
a first capacitor connected by a first terminal to said first transformer;
a second transformer;
a first switching element for connecting the second terminal of said first capacitor and the primary winding of said second transformer;
a second switching element for connecting the second terminal of said first capacitor and the second terminal of said input capacitor;
a second capacitor connected in series with the primary winding of said second transformer;
a third switching element for connecting the first terminal of said input capacitor and the primary winding of said second transformer;
a coil connected between said bridge rectifying circuit and the primary winding of said second transformer;
a first rectifying element connected to the secondary winding of said first transformer;
a second rectifying element connected to the secondary winding of said second transformer; and
a control unit for controlling the operation of said first to third switching elements,
wherein the primary windings of said first and second transformers are connected in series with the power source, wherein
said control unit controls so as to switch said second and third switching elements ON in a first period, to switch said first and second switching elements ON in a second period, to switch said second and third switching elements ON in a third period, and to switch said first and third switching elements ON in a fourth period;
in said first to third periods, the electric current generated in the secondary winding side of said first transformer is supplied by said first rectifying element to a load; and
in said first, third, and fourth periods, the electric current generated in the secondary winding side of said second transformer is supplied by said second rectifying element to the load.

10. A power source apparatus, comprising:
first and second transformers, the first and second transformers having different secondary windings separately coupled to respective primary windings,
a capacitance element connected to each of said transformers;
a switching circuit connected to the primary windings of each of said transformers and connected to a power supply source;
a rectifying circuit for rectifying and synthesizing outputs of the secondary windings of each of said transformers and for supplying the synthesized outputs to a load; and
a control circuit for controlling an operation of said switching circuit according to the outputs supplied to said load,
wherein the primary windings of said first and second transformers are connected in series with the power supply source, wherein
said switching circuit is composed of no more than and no less than three switching elements; and
said control circuit changes a connection state of said capacitance element and each of said transformers, and a connection state of said power supply source and each of said transformers by controlling a drive timing of said three switching elements and said three switching elements form:
a first mode of forming a closed loop composed of the primary winding of said first transformer and said capacitance element, and forming a closed loop composed of the primary winding of said second transformer and said capacitance element;
a second mode of forming a closed loop composed of the primary winding of said first transformer and said capacitance element, and forming a closed loop composed of the primary winding of said second transformer and said power supply source; and
a third mode of forming a closed loop composed of the primary winding of said second transformer and said capacitance element and forming a closed loop composed of the primary winding of said first transformer and said power supply source.

11. A power source apparatus, comprising:
first and second transformers, the first and second transformers having different secondary windings separately coupled to respective primary windings,
a capacitance element connected to each of said transformers;
a switching circuit connected to the primary windings of each of said transformers and connected to a power supply source;
a rectifying circuit for rectifying and synthesizing outputs of the secondary windings of each of said transformers and for supplying the synthesized outputs to a load; and
a control circuit for controlling an operation of said switching circuit according to the outputs supplied to said load,
wherein the primary windings of said first and second transformers are connected in series with the power supply source, wherein
said switching circuit is composed of no more than and no less than three switching elements; and
said control circuit changes a connection state of said capacitance element and each of said transformers, and a connection state of said power supply source and each of said transformers by controlling a drive timing of said three switching elements and
said three switching elements form:
a first mode of forming a closed loop composed of the primary winding of said first transformer, said capacitance element, and said power supply source and forming a closed loop composed of the primary winding of said second transformer, said capacitance element, and said power supply source;
a second mode of forming a closed loop composed of the primary winding of said first transformer, said capacitance element, and said power supply source and forming a closed loop composed of the primary winding of said second transformer and said capacitance element; and
a third mode of forming a closed loop composed of the primary winding of said second transformer, said capacitance element, and said power supply source and forming a closed loop composed of the primary winding of said first transformer and said capacitance element.

12. A power source apparatus, comprising:
first and second transformers;
a capacitance element connected to each of said transformers;

a switching circuit connected to the primary windings of each of said transformers and connected to a power supply source;

a rectifying circuit for rectifying and synthesizing outputs of the secondary windings of each of said transformers and for supplying the synthesized outputs to a load; and a control circuit for controlling an operation of said switching circuit according to the outputs supplied to said load, wherein the primary windings of said first and second transformers are connected in series with the power supply source, wherein said switching circuit is composed of first to third switching elements;

said first switching element, in the ON state, constitutes a closed loop composed of the primary winding of said first transformer and said capacitance element and, in association with said third switching element in the ON state, constitutes a closed loop composed of the primary winding of said second transformer and said power supply source;

said second switching element, in the ON state, constitutes a closed loop composed of the primary winding of said second transformer and said capacitance element and, in association with said third switching element in the ON state, constitutes a closed loop composed of the primary winding of said first transformer and said power supply source; and said third switching element, in the OFF state, disconnects each of said transformers and said capacitance element from said power supply source.

13. A power source apparatus comprising:

first and second transformers;

a first capacitance element connected to said first transformer;

a second capacitance element connected to said second transformer;

a switching circuit connected to the primary windings of each of said transformers and connected to a power supply source;

a rectifying circuit for rectifying and synthesizing the outputs of the secondary windings of each of said transformers and for supplying the synthesized outputs after the synthesis to a load; and a control circuit for controlling an operation of said switching circuit according to the outputs supplied to said load, wherein the primary windings of said first and second transformers are connected in series with the power supply source, wherein said switching circuit is composed of first to third switching elements; and said first switching element, in the ON state, constitutes a closed loop composed of the primary winding of said first transformer and said first capacitance element and, in association with said third switching element in the ON state, constitutes a closed loop composed of the primary winding of said second transformer, said second capacitance element, and said power supply source;

said second switching element, in the ON state, constitutes a closed loop composed of the primary winding of said second transformer and said second capacitance element and, in association with said third switching element in the ON state, constitutes a closed loop composed of the primary winding of said first transformer, said first capacitance element, and said power supply source; and said third switching element, in the OFF state, disconnects the primary windings of each of said transformers and said first and second capacitance elements from said power supply source.

14. A power source apparatus comprising:

first and second transformers;

a first capacitance element connected to said first transformer;

a second capacitance element connected to said second transformer;

a switching circuit provided on the primary windings of each of said transformers and connected to a power supply source;

a rectifying circuit for rectifying and synthesizing the outputs of the secondary windings of each of said transformers and for supplying the synthesized outputs to a load; and a control circuit for controlling an operation of said switching circuit according to the outputs supplied to said load, wherein the primary windings of said first and second transformers are connected in series with the power supply source, wherein said switching circuit is composed of no more than and no less than three switching elements, the switching circuit comprising first to third switching elements; and said first switching element, in the ON state, constitutes a closed loop composed of the primary winding of said first transformer, said first capacitance element, and said power supply source and, in association with said third switching element in the ON state, constitutes a closed loop composed of the primary winding of said second transformer and said second capacitance element;

said second switching element, in the ON state, constitutes a closed loop composed of the primary winding of said second transformer, said second capacitance element, and said power supply source and, in association with said third switching element in the ON state, constitutes a closed loop composed of the primary winding of said first transformer and said first capacitance element; and said third switching element, in the OFF state, provides for parallel connection of a closed loop composed of the primary winding of said first transformer, said first capacitance element and said power supply source and a closed loop composed of the primary winding of said second transformer, said second capacitance element, and said power supply source.

* * * * *

UNITED STATES PATENT AND TRADEMARK OFFICE
CERTIFICATE OF CORRECTION

| | | |
|---|---|---|
| PATENT NO. | : 7,586,759 B2 | Page 1 of 1 |
| APPLICATION NO. | : 10/943350 | |
| DATED | : September 8, 2009 | |
| INVENTOR(S) | : Harada et al. | |

It is certified that error appears in the above-identified patent and that said Letters Patent is hereby corrected as shown below:

Title Page 1, Item (30), Line 2, please delete "Sep. 17, 2004" and insert therefore, --Sep. 17, 2003--.

At Column 2, Line 14, please delete "apparatus" and insert therefore, --apparatus,--.

At Column 23, Line 1, please delete "clement" and insert therefore, --element--.

At Column 26, Line 54, please delete "element" and insert therefore, --element,--.

Signed and Sealed this

Sixteenth Day of March, 2010

David J. Kappos
*Director of the United States Patent and Trademark Office*